United States Patent [19]
Sawahata

[11] Patent Number: 5,859,784
[45] Date of Patent: Jan. 12, 1999

[54] METHOD FOR IMPURITY DISTRIBUTION SIMULATION

[75] Inventor: Koichi Sawahata, Tokyo, Japan

[73] Assignee: NEC Corporation, Tokyo, Japan

[21] Appl. No.: 686,549

[22] Filed: Jul. 26, 1996

[30]     Foreign Application Priority Data

Jul. 28, 1995   [JP]   Japan ................................ 7-192754

[51] Int. Cl.⁶ ........................... G06F 9/455; G06F 17/50
[52] U.S. Cl. ........................................................ 364/578
[58] Field of Search ............................ 395/500; 364/578, 364/488–491

[56]              References Cited

U.S. PATENT DOCUMENTS

| | | | |
|---|---|---|---|
| 4,771,012 | 9/1988 | Yabu et al. ............................. | 437/29 |
| 5,627,772 | 5/1997 | Sonoda et al. ......................... | 364/578 |
| 5,635,413 | 6/1997 | Mitsunaga et al. .................... | 438/298 |

OTHER PUBLICATIONS

H. Ryssel et al., "Models for Implantation into Multilayer Targets", *Appl. Phys. A 41*, 1986, pp. 201–207.

M.E. Law et al., "The Effect of Implantation Damage on Arsenic/Phosphorus Codiffusion", *IEDM 88*, 1988, pp. 640–643.

M. Hane et al., "Ion Implantation Model Considering Crystal Structure Effects", *IEDM 88*, 1988, pp. 648–651.

Analysis and Simulation of Semiconductor Devices, Chapter 3, Springer–Verlag Vien, New York, pp. 47–63.

*Primary Examiner*—Kevin J. Teska
*Assistant Examiner*—Ayni Mohamed
*Attorney, Agent, or Firm*—Sughrue, Mion, Zinn, Macpeak & Seas, PLLC

[57]           ABSTRACT

A method for simulating an impurity distribution in a multilayer structure includes analytically simulating an impurity distribution for each layer to obtain a first impurity distribution profile for each layer by using impurity distribution moments defined for the material of each layer, analytically simulating a point defect distribution for a crystal layer to obtain a point defect distribution profile by using the first impurity distribution profile and point defect distribution moments defined for the material of crystal layer, simulating a thermal diffusion to obtain a final impurity distribution profile for each layer by using the first impurity distribution profile and point defect distribution profile. The point defect distribution moments are obtained previously for the material of the crystal layer by Monte Carlo method under typical conditions to obviate using the Monte Carlo method for each simulation under a specified condition.

5 Claims, 8 Drawing Sheets

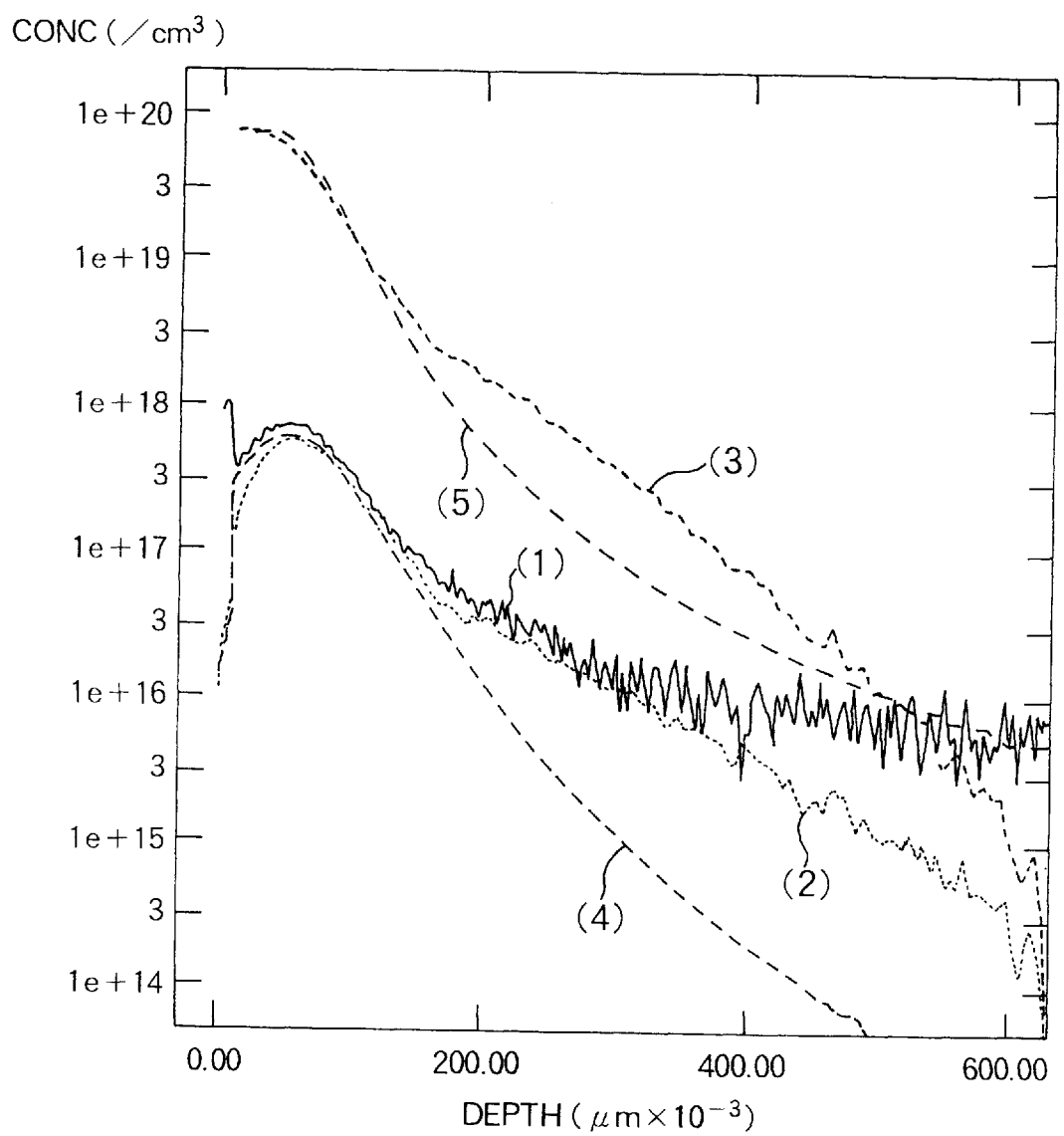

METHOD FOR IMPURITY DISTRIBUTION SIMULATION

BACKGROUND OF THE INVENTION (a). Field of the Invention

The invention relates to a method for an impurity distribution simulation for use in a semiconductor manufacturing process.

(b). Description of the Related Art

A conventional technique to simulate an impurity distribution in a semiconductor manufacturing process which includes a combination of an ion implantation and a thermal diffusion steps will be described first. FIG. 1 is a flowchart of the conventional technique used to simulate an ion implantation and a thermal diffusion steps.

Initially, at step T1, a decision is made whether or not a subject step to be simulated is an ion implantation. If it is an ion implantation, the ion implantation simulation is performed at step T2.

There are two categories in methods for simulation which have been used for an ion implantation, including an analytical method and a Monte Carlo method. An ion implantation simulation for an arbitrary multilayer structure using an analytical technique can be made by expanding a method for a two-layer structure which is described in an article entitled "Models for Implantation into Multilayer Targets" by H. Ryssel, J. Lorens and K. Hoffmann in Appl. Phys. A41, 201–207(1986).

If it is determined at step T1 that this is not an ion implantation step, it is determined at step T3 whether or not the step to be performed is a thermal diffusion. If a thermal diffusion is to be performed in this-step, a thermal diffusion simulation takes place at step T4. After performing an ion implantation simulation or a thermal diffusion simulation after step T2 or step T4 in FIG. 1, it is determined at step T5 whether all the steps have been completed. If not, the operation returns to step T1, repeating the above described procedure.

A simulation technique for the thermal diffusion known in the art are conducted in two ways, one not considering and another considering a point defect distribution. In order to effect a simulation with a good accuracy for a semiconductor manufacturing process, which includes an ion implantation and a thermal diffusion steps, it is essential to use a thermal diffusion simulation which tales a point defect distribution into consideration. To effect a thermal diffusion simulation which consider the point defect distribution during the thermal diffusion step, it is necessary that a point defect distribution which occurs during the ion implantation be continually calculated. At this end, a simulation for the ion implantation step should be conducted in the conventional technique by using Monte Carlo method in the ion implantation simulation.

However, there is a problem in conducting the Monte Carlo method in the ion implantation simulation in that it requires an increased length of time for the calculation. This is because the Monte Carlo method performs a simulation of a scattering process for each ion implanted in a statistical method, in which the calculation for one ion implantation simulation should cover at least 1,000 to 10,000 ion particles. In practice, when such a simulation is conducted for phosphorus ions at an energy on the order of 1,000 keV and for a number of particles, which is 10,000 for example, the calculation requires 10 hours or longer using a work station of, for example, model 95MIPS, 54SPECfp92.

SUMMARY OF THE INVENTION

It is an object of the invention to provide an improved method for simulating impurity distribution for a multilayer structure for use in a semiconductor manufacturing process, including an ion implantation step and a thermal diffusion step.

In accordance with the present invention, there is provided a method for simulating an ion implantation applied to a multilayer structure having a plurality of layers including at least one crystal layer. The method includes a first step of analytically simulating an impurity distribution for each of the layers to obtain a first impurity distribution profile for the each of layers by using impurity distribution moments defined for the each of the layers, a second step of analytically simulating a point defect distribution for the crystal layer to obtain a point defect distribution profile by using the first impurity distribution profile and point defect distribution moments defined for the crystal layer, a third step of simulating a thermal diffusion for the each of the layers to obtain a second impurity distribution profile for the each of the layers by using the first impurity distribution profile and the point defect distribution profile.

In the method according to the present invention, the point defect distribution moments for the material of the crystal layer are preferably obtained by Monte Carlo Method before the simulation under typical conditions and the momonets for a particular condition is obtained by an interpolation between the typical conditions.

Further, the second step preferably includes calculating a normalized point defect distribution profile and shifting the normalized point defect distribution profile in a depthwise direction by a first and a second amounts. The first amount may correspond to a projected range for impurity ions in said crystal layer. The second amount may correspond to a difference between a first projected range for implanted ions and a second projected range for vacancies both in the crystal layer.

According to the method for impurity distribution simulation of the present invention, since simulation for obtaining the impurity distribution profile and point defect distribution profile for the crystal layer is conducted by analytical simulation instead of Monte Carlo method, the length of time required for the simulation can be reduced. By simulating the thermal diffusion while taking the point defect distribution into consideration, an accurate impurity profile after the thermal diffusion can be reached by the thermal diffusion simulation.

BRIEF DESCRIPTION OF THE DRAWINGS

FIG. 2A is a schematic diagram for a substrate having a two-layer structure while

FIG. 3A is schematic diagram showing a projected range additionally to the structure of FIG. 2A while

FIG. 11 is a graph showing profiles obtained by simulation for impurity distribution and point defect distribution according to the first embodiment.

DESCRIPTION OF THE PREFERRED EMBODIMENTS

Figure 1:
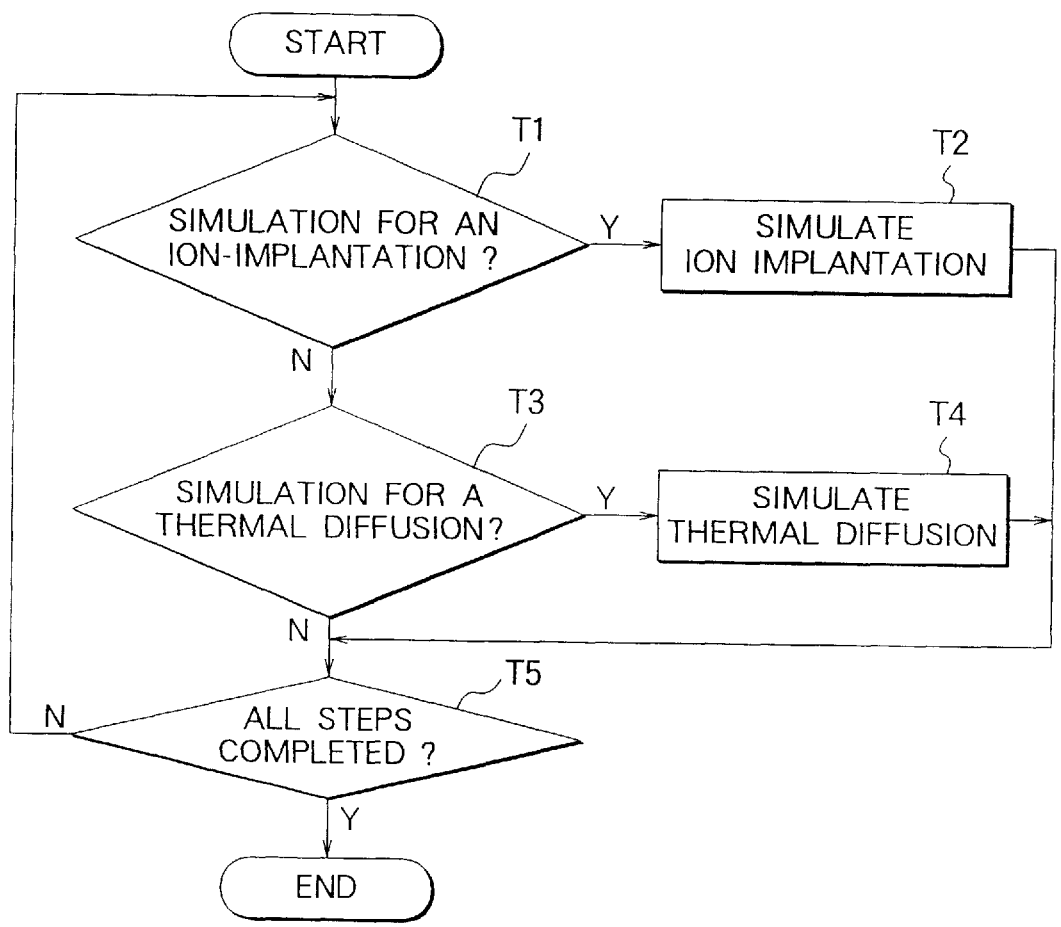
FIG. 1 is a flow chart of a simulation of a semiconductor manufacturing process including an ion implantation step and a thermal diffusion step.

Before describing embodiments of the invention, known techniques used in the embodiments will be described. In order to understand a simulation for an ion implantation for a substrate having a multilayer structure, an analytical simulation method for an ion implantation into a single-layer substrate will be first described. Such analytical simulation method is described in "Analysis and Simulation of Semiconductor Devices" published by Springer-Verlag Vien New York. According to this approach, an impurity distribution can be represented by three analytical equations for Gaussian distribution, combined Gaussian distribution and Pearson distribution, using parameters Rp, ΔRp, γ, β, generally referred to as moments and herein referred to as impurity distribution moments, which characterize the impurity distribution after the ion implantation. Here, Rp stands for a projected range representing a mean depth of implanted ions, ΔRp for a standard deviation representing a spread of distribution of implanted ions, γ for a skewness representing a distortion of the distribution, and β for a quantity called kurtosis representing the sharpness of the distribution, all these parameters being extracted from profiles which are previously and actually measured.

By using parameters Rp and ΔRp, the Gaussian distribution is expressed as a function of depth "R", as follows:

$$I(R) = \frac{1}{\sqrt{2\pi}\Delta Rp} \exp\left[\frac{-(R-Rp)^2}{2\Delta Rp^2}\right] \quad (1)$$

By using Rp, ΔRp and γ, the combined Gaussian distribution is expressed as follows:

$$I(R) = \frac{\sqrt{2}}{\sqrt{\pi}(\sigma_1 + \sigma_2)} \exp\left[\frac{-(R-Rm)^2}{2\sigma_1^2}\right] \text{ for } R < Rm$$

$$I(R) = \frac{\sqrt{2}}{\sqrt{\pi}(\sigma_1 + \sigma_2)} \exp\left[\frac{-(R-Rm)^2}{2\sigma_2^2}\right] \text{ for } R \geq Rm \quad (2)$$

$$Rp = Rm + \sqrt{2/\pi}\,(\sigma_2 - \sigma_1) \quad (3)$$

$$\Delta Rp^2 = \left(1 - \frac{2}{\pi}\right)(\sigma_2 - \sigma_1)^2 + \sigma_1\sigma_2 \quad (4)$$

$$\gamma \Delta Rp^3 = \sqrt{2/\pi}\,(\sigma_2 - \sigma_1)\left[\left(\frac{4}{\pi} - 1\right)(\sigma_2 - \sigma_1)^2 + \sigma_1\sigma_2\right] \quad (5)$$

wherein $\sigma_1$ and $\sigma_2$ represent one-sided standard deviations for the Gaussian distribution in upper and lower sides of the profile, respectively, and Rm is a modal projected range of implanted ions.

By using all the parameters, Rp, ΔRp, γ and β, the Pearson distribution is expressed as follows:

$$\frac{dI(y)}{dy} = \frac{(y-a)I(y)}{b_0 + ay + b_2 y^2} \quad (6)$$

$$y = R - Rp \quad (7)$$

$$a = \frac{-\Delta Rp \cdot \gamma \cdot (\beta + 3)}{A} \quad (8)$$

$$b_0 = \frac{-\Delta Rp^2 \gamma (4\beta - 3\gamma^2)}{A} \quad (9)$$

$$b_2 = \frac{-2\beta + 3\gamma^2 + 6}{A} \quad (10)$$

$$A = 10\beta - 12\gamma^2 - 18 \quad (11)$$

Those functions I(R) as mentioned above are normalized so that their integral is equal to unit. A distribution after the ion implantation can be obtained by multiplying the function by a dosage of an ion implantation.

Figure 2A:
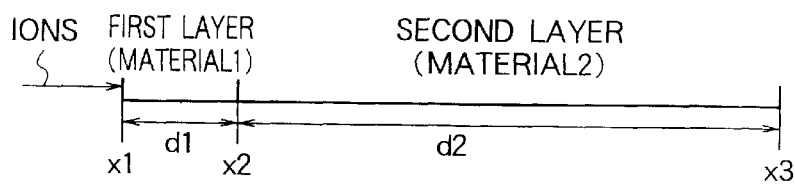
Figure 2B:
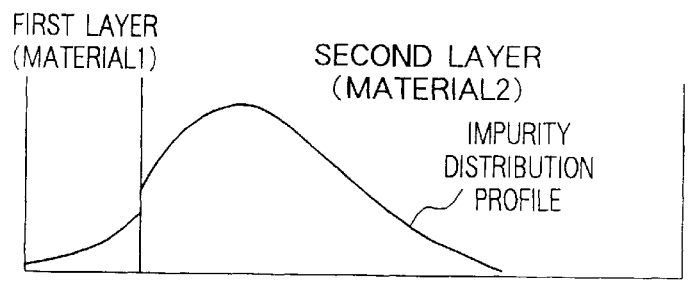
FIG. 2B shows an impurity distribution obtained for the substrate of FIG. 2A by a conventional simulation.

A simulation for a two-layer substrate will be now described. FIG. 2A illustrates a schematic diagram for a substrate having a two-layer structure during an ion implantation, while FIG. 2B shows the profile of the impurity distribution obtained for the structure of FIG. 2A. An impurity distribution in the first and the second layer is calculated by using a normalized impurity distribution $I_k(R)$, which is obtained by employing the impurity distribution moments defined for the materials of the respective layers, wherein k stands for the number of a particular layer.

For the first layer, an impurity distribution $C_1(R)$ is derived from $I_1(R)$, as indicated below:

$$C_1(R) = \text{Dose} \cdot I_1(R) \quad (12)$$

wherein Dose represents a dosage of the ion implantation (ions/cm$^2$).

Figure 3A:
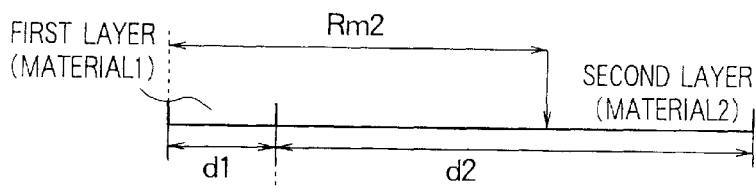
Figure 3B:
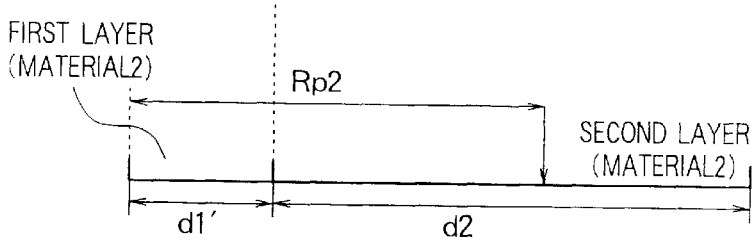
FIG. 3B shows an equivalent substrate structure equivalent to the structure of FIG. 3A.

Before obtaining $C_2(R)$ for the second layer, the projected range $Rm_2$ for the impurity distribution in the second layer is calculated. FIG. 3A again shows the structure of FIG. 2A added by the position corresponding to $Rm_2$ and FIG. 3B shows equivalent structure for FIG. 3A in which the first layer material in the upper (first) layer is replaced by the lower (second) layer material having an equivalent thickness. Here, the layer thickness $d_1$ for the upper layer is shown as converted according to the following formula:

$$d'_1 = \frac{Rp_2}{Rp_1} d_1 \quad (13)$$

It is assumed that as a result of the above conversion, there is a relationship between $Rm_2$ and $Rp_2$, as indicated below:

$$Rm_2 - d_1 = Rp_2 - d'_1 \quad (14)$$

From equations (13) and (14), the following formula:

$$Rm_2 = Rp_2 + \left(1 - \frac{Rp_2}{Rp_1}\right) d_1 \quad (15)$$

can be obtained. Thus, $Rm_2$ for the impurity distribution in the second layer is larger than $Rp_2$ by $(1-(Rp_2/Rp_1))d_1$, and accordingly the impurity distribution for the second layer can be obtained, by using a function $I_2(R-d_1+d_1(Rp_2/Rp_1))$ which is a result of a translation of $I_2(R)$ by $(1-(Rp_2/Rp_1))d_1$ into a positive direction of depth R, as indicated below:

$$C_2(R) = Q_2 I_2 \left( R - d_1 + d_1 \frac{Rp_2}{Rp_1} \right) \quad (16)$$

(see FIG. 2B), wherein $Q_2$ is expressed as follows:

$$Q_2 = \text{Dose} - \int_{X_1}^{X_2} C_1(R) dR \quad (17)$$

Figure 4:
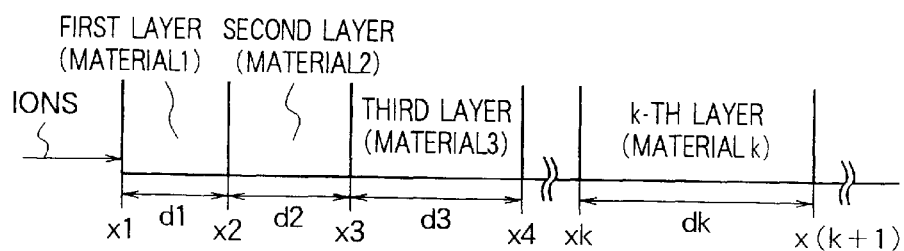
FIG. 4 is a schematic diagram of a multilayer substrate structure.

FIG. 4 shows a substrate having a more generalized multilayer structure. An ion implantation for such a structure can be simulated similarly to the ion implantation for the two-layer structure. The algorithm therefor is indicated below.

Step (a): let k=1.
Step (b): determine $Q_k$ from the formulae indicated below:

$$\left. \begin{array}{ll} Q_k = \text{Dose} & (k = 1) \\ Q_K = Q_{k-1} - \int_{X_{k-1}}^{X_k} C_{k-1}(R) dR & (k > 1) \end{array} \right\} \quad (18)$$

where Dose represents a dosage (ions/cm$^2$) of an implanted impurity, and $C_k(R)$ an impurity distribution of k-th layer.

Step (c): obtain an impurity distribution Ck(R) of a k-th layer from the following formula:

$$C_k(R) = Q_k \cdot I_k \left( R - \sum_{i=1}^{k-1} d_i \left[ 1 - \frac{Rp_k}{Rp_i} \right] \right) \quad (19)$$

where $I_k(R)$ represents a normalized impurity distribution for the k-th layer and $Rp_k$ a projected range defined for the material of the k-th layer.

Step (d): if k does not represent the final layer, let k=k+1, and repeating the steps (b), (c) and (d). End the process if the k-th layer represents the final layer.

Figure 5:
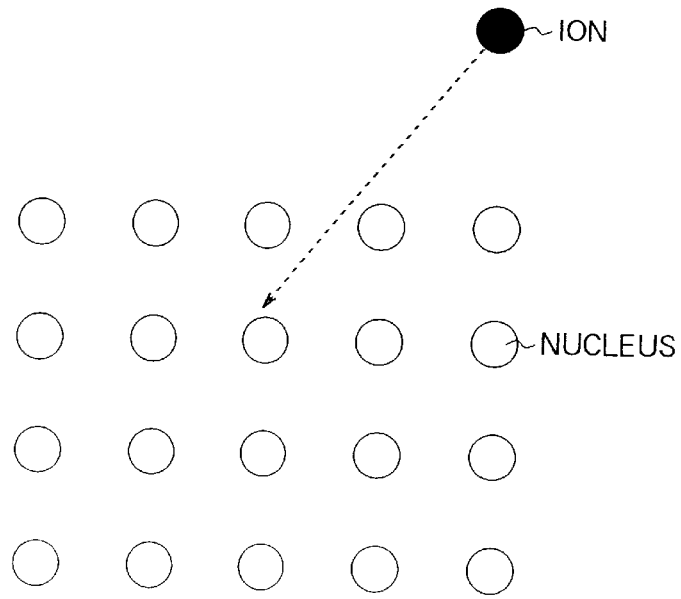
FIG. 5 schematically illustrates an implanted ion introduced into a crystal structure.

The another technique referred to as Monte Carlo method will be discussed below. Monte Carlo method for the simulation in an ion implantation is described in "ION IMPLANTATION MODEL CONSIDERING CRYSTAL STRUCTURE EFFECTS" by Masami Hane and Masao Fukuma in IEDM (1988). This literature indicates that when an ion is implanted into a crystal substrate as shown in FIG. 5, the implanted ion advances while being subjected to scattering by nuclei, thereby losing its energy. It also loses energy during the process of scattering by electrons which exist around a nucleus. Such process is simulated from particle to particle, and a distribution of particles when they stop within the substrate finally provides an impurity distribution after the ion implantation.

By simulating a process in which the ion expels electrons which constitute the crystal, a point defect distribution for vacancies and interstitials after the ion implantation can be calculated.

As described before, a simulation technique for the thermal diffusion known in the art includes one not considering and another considering a point defect distribution. A conventional technique not considering the point defect distribution is described in "VLSI design/manufacture simulation" by Michitada Morisue, p52, which will be summarized below.

An impurity distribution is calculated according to the following diffusion equations:

$$\frac{dC}{dt} = -\frac{dJ}{dx} \quad (20)$$

$$J = -D \frac{dC}{dx} \pm D \left( \frac{qE}{kT} \right) C_a \quad (21)$$

$$\left. \begin{array}{l} E = -\frac{dV}{dx} = -\frac{kT}{q} \frac{dn}{dx} \frac{1}{n} \quad \text{(in semiconductor)} \\ E = 0 \quad \text{(in insulator or conductor)} \end{array} \right\} \quad (22)$$

wherein C represents a chemical impurity concentration, Ca an electrically active impurity concentration, n an electron concentration, and wherein:

$$n = \exp\left(\frac{qV}{kT}\right) \quad (23)$$

$$\mu = \frac{qD}{kT} \quad (24)$$

$$n = \frac{1}{2} \left( C_a + \sqrt{C_a^2 + 4n_i^2} \right) \quad (25)$$

$$n_i = 3.87 \times 10^{16} \exp\left(\frac{-0.605}{kT}\right) T^{1.5} \quad (26)$$

Considering a contribution by neutral vacancy of D°, a contribution by positive vacancy of D$^+$, a contribution by negative vacancy of D$^-$, and a contribution by divalent negative vacancy of D$^=$, a diffusion coefficient is given by the following formula:

$$D°D°+D^+[V^+]+D^-[V^-]+D^=[V^=] \quad (27)$$

wherein [V$^+$], [V$^-$] and [V$^=$] represent normalized vacancy concentrations, which can be expressed in terms of a carrier concentration n, as indicated below:

$$D = D^0 + D^+ \frac{n_i}{n} + D^- \frac{n}{n_i} + D^= \left(\frac{n}{n_i}\right)^2 \quad (28)$$

wherein D°, D$^+$, D$^-$ and D$^=$ are expressed as follows:

$$D^x = D_0^x \exp\left(\frac{E}{kT}\right) \quad (29)$$

where x stands for 0, +, −, =.

Problems are pointed out to exist in the conventional diffusion simulation technique which does not take the point defect distribution into consideration. A literature "THE EFFECT OF IMPLANTATION DAMAGE ON ARSENIC/PHOSPHORUS CODIFFUSION" by M. E. Law, J. R. Pfiester and R. W. Dutton, IEDM (1988) states that when a thermal diffusion simulation is made for process, which includes an ion implantation and an a thermal diffusion steps, without taking the vacancies into consideration, poor coincidence is reached between an impurity distribution profile which results from the simulation and impurity distribution profile which is actually determined. This will be discussed below with reference to FIGS. 6 to 9, which are presented in the literature.

Figure 6:
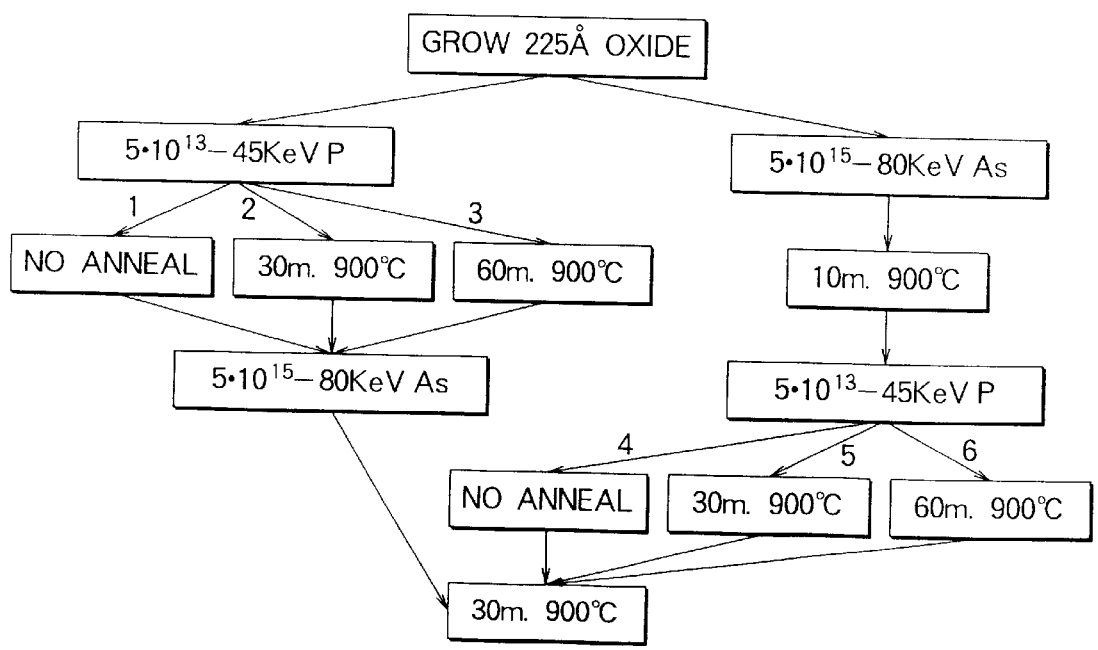
FIG. 6 is a flowchart of processes for fabricating sample wafers presented by a literature.

FIG. 6 shows flowchart showing process steps for wafer samples formed by ion implantation and thermal diffusion steps under different conditions. Sample wafers 1 to 6 are shown in the drawing as respective numerals 1 to 6, which is affixed to respective process flows in the drawing. For example, sample wafer 1 is formed by the steps of growing 225 angstrom-thick oxide, phosphorous ion implantation at 45 keV acceleration energy and $5 \times 10^{13}$ ions/cm$^2$ dosage, no thermal annealing, arsenide ion implantation at 80 keV acceleration energy and $5 \times 10^{15}$ ions/cm$^2$ dosage, and thermal diffusion at 900° C. for 30 minutes. Similarly, sample wafer 5 is formed by the steps of growing 225 angstrom-thick oxide, arsenide ion implantation at 80 keV acceleration energy and $5 \times 10^{15}$ ions/cm$^2$ dosage, annealing at 900° C. for 10 minutes, phosphorous ion implantation at 45 KeV acceleration energy and $5 \times 10^{13}$ ions/cm$^2$ dosage, thermal annealing at 900° C. for 30 minutes and thermal diffusion at 900° C. for 30 minutes.

Figure 7:
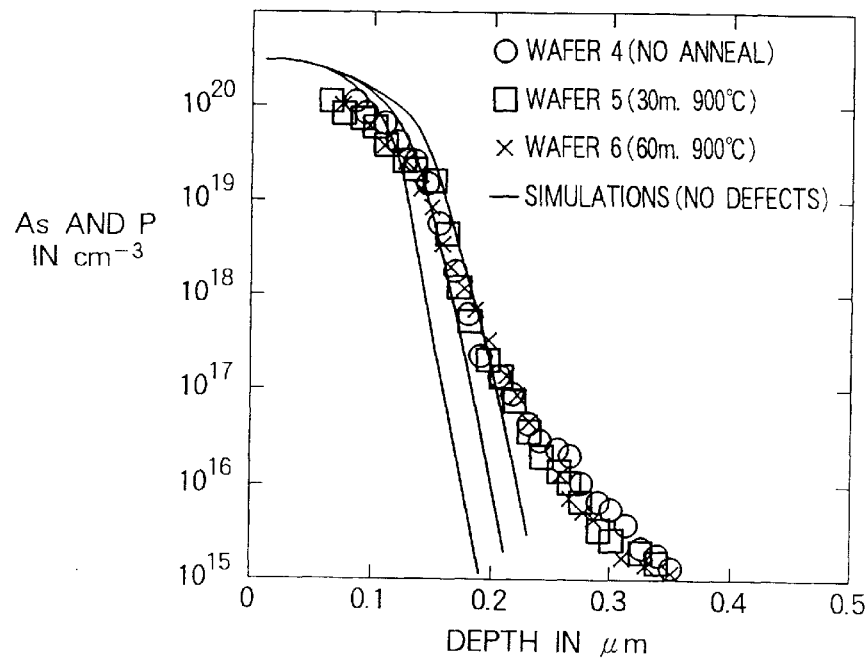
FIGS. 7 and 8 are graphs each showing deviation of the results of a conventional simulation method from the actual results, for the samples obtained by the processes shown in FIG. 6.
Figure 8:
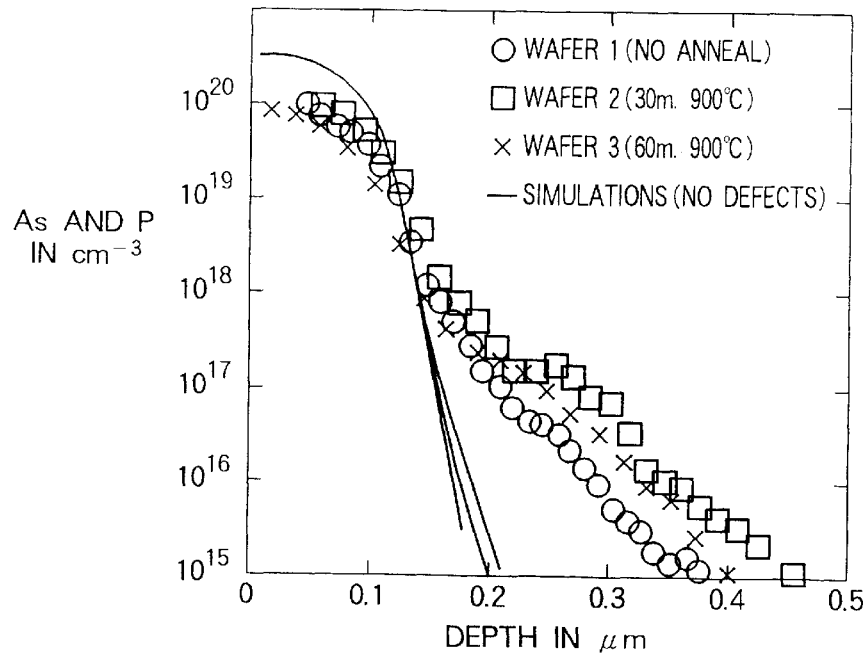

FIGS. 7 and 8 graphically illustrate results of comparison of the impurity distributions by simulation with the actual impurity distribution in sample wafers 4 to 6 and sample wafers 1 to 3, respectively. It is noted that FIGS. 7 and 8 do not exhibit a satisfactory coincidence between the experimental results and the simulations.

The reason therefore is analyzed in the literature as attributable to a model used in a conventional thermal diffusion simulation, which does not fully model diffusion growth and combination mechanisms of point defect distribution which provides an influence upon the diffusion of impurities, but which is a model incapable of accurately calculating a change in the point defect distribution generated at the time of the ion implantation as well as its influence upon the impurity distribution during the thermal diffusion.

As another model which overcomes above problems, there is a thermal diffusion simulation which takes the point defect distribution into consideration, which will be described below.

The above literature by M. E. Law, et al, proposes an impurity diffusion model considering the vacancies as follows:

$$\frac{\partial C_D}{\partial t} = -\nabla [J_{ID} + J_{VD}] \quad (30)$$

$$\frac{\partial}{\partial t}(C_I + C_{ID}) = -\nabla (J_I + J_{ID}) - K_R(C_I C_V - C_I^* C_V^*) \quad (31)$$

$$\frac{\partial}{\partial t}(C_V + C_{VD}) = -\nabla (J_V + J_{VD}) - K_R(C_I C_V - C_I^* C_V^*) \quad (32)$$

where C represents an ion concentration, J an ion flow, $K_R$ a recombination coefficient and D a diffusion coefficient. A suffix D represents a donor, suffix I an interstitial silicon, suffix V an atom vacancy, suffix ID a pair of interstitial silicon and donor, and suffix VD a pair of atom vacancy and donor. Flow $J_{ID}$ of the pair of interstitial atom and donor is given as follows:

$$-J_{ID} = \frac{D_{DI} C_I}{C_I^*} \left[ C_D \nabla \log \left( C_D \frac{n}{n_i} \frac{C_I}{C_I^*} \right) \right]. \quad (33)$$

Flow $J_I$ of interstitial. silicon is given as follows:

$$-J_I = D_I C_I^6 * \nabla \frac{C_I}{C_I^*}. \quad (34)$$

A similar equation applies for $J_{VD}$.

Figure 9:
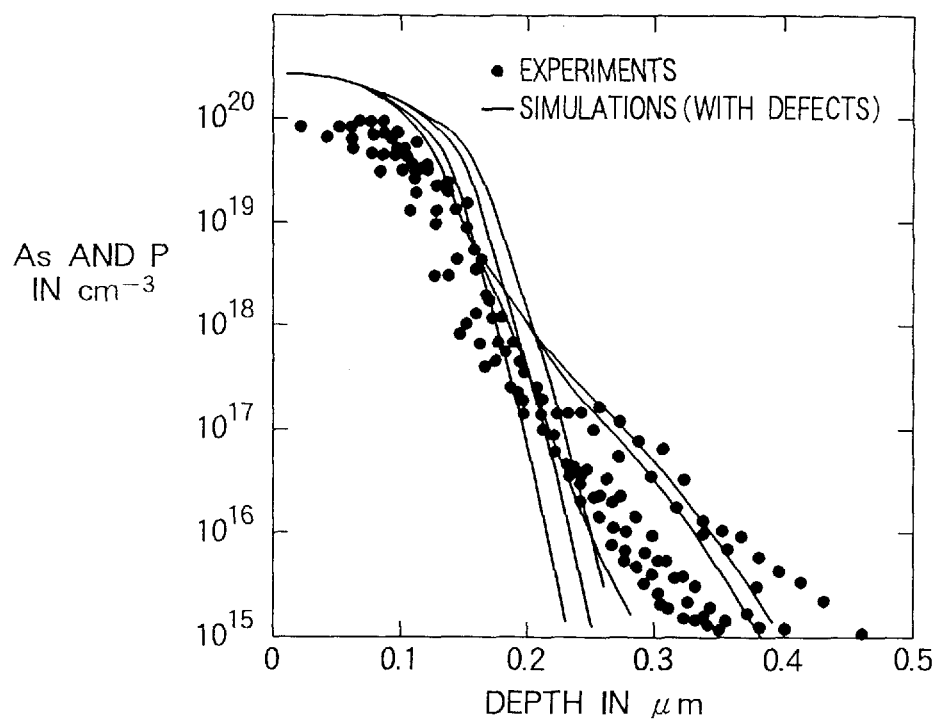
FIG. 9 is a graph showing the results of another conventional simulation and of the actual results.

It is stated in the literature that, when the model is used to effect the simulation under the conditions of preparing the sample wafers 1 to 6 shown in FIG. 6, the results exhibit an excellent coincidence with actual measurements by SRP (Spreading resistance probing method) as shown in FIG. 9.

Now, embodiments of the invention will be described in detail with reference to the drawings.

Figure 10A:
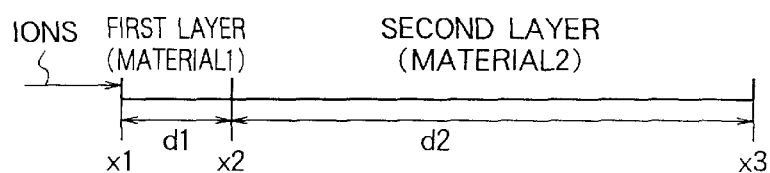
FIGS. 10A, 10B and 10C are a schematic diagram of a two-layer substrate, an impurity distribution profile in the substrate of FIG. 10A and an impurity distribution and a point defect distribution profiles for the substrate of FIG. 10A, respectively, obtained by a first embodiment of the present invention.
Figure 10B:
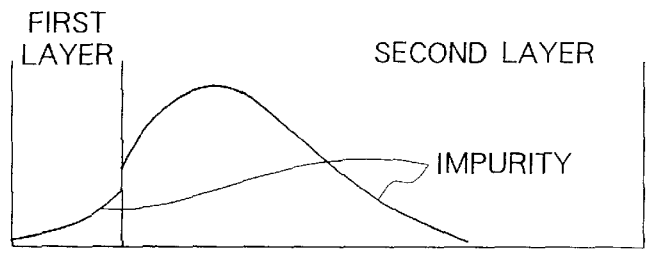
Figure 10C:
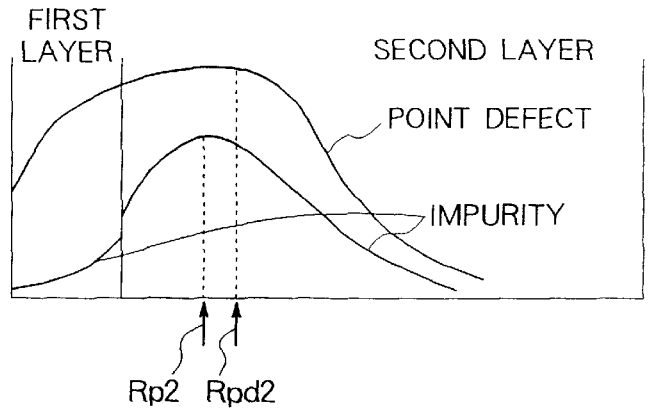

An impurity ion distribution simulation according to a first embodiment of the invention is applied to a two-layer substrate shown in FIG. 10A which is similar to FIG. 2A. The substrate includes an oxide film as a first layer and a crystal silicon layer as a second layer. In this process, an ion implantation simulation is first conducted with respect to the substrate, calculating an impurity distribution in each layer as shown in FIG. 10B, and a point defect distribution additionally to FIG. 10B in the crystal silicon layer for providing distributions shown in FIG. 10C. The calculation of the impurity distribution and a point defect distribution is conducted as detailed below.

Before simulation of a particular substrate under particular condition, the substrate are simulated by Monte Carlo method under typical conditions including, for example, at acceleration energies of 10 keV, 20 keV, 30 keV, . . . , and 100 keV. It is assumed that the distribution is expressed by the following equation:

$$Cd_2(R) = F_2 \cdot Q_2 \cdot Id_2 \left( R - \left( d_1 - d_1 \frac{Rp_2}{Rp_1} \right) - (-Rp_2 + Rpd_2) \right). \quad (35)$$

The results obtained by the Monte Carlo method and the distribution $Cd_2(R)$ as obtained by the equation (35) are used to determine the point defect distribution moments $Rpd_2$, $\Delta Rpd_2$, $\gamma pd_2$ and $\beta pd_2$ and coefficient $F_2$ by using a least square method. Thus obtained point defect moments are plotted against the typical conditions, for example, against acceleration energy. The intermediate value for the moments can be obtained by an interpolation between the typical conditions.

In a simulation of the particular substrate under a specified condition, an impurity distribution is first determined according to the conventional analytical technique using one of Gaussian distribution, combined Gaussian distribution and Pearson distribution, as described before. For example, Pearson distribution is employed here. As a consequence, an impurity distribution for the first layer is given by the equation (12) as follows:

$$C_1(R) = D \times I_1(R).$$

An impurity distribution for the second layer is also given by the equation (16) as follows:

$$C_2(R) = Q_2 I_2 \left( R - d_1 + d_1 \frac{Rp_2}{Rp_1} \right)$$

Thus obtained distribution profiles are exemplified in FIG. 10B.

Since the second layer comprises a crystal silicon, a point defect distribution for the second layer must be calculated additionally to the ion distribution in order to obtain an accurate simulation for a subsequent thermal diffusion. In this calculation, the normalized point defect distribution $Id_2(R)$ for the second layer is given by impurity projected ranges $Rp_1$ and $Rp_2$ defined for the materials of the first and second layers under the specified condition, together with point defect distribution moments $Rpd_2$, $\Delta Rpd_2$, $\gamma pd_2$ and $\beta pd_2$ and coefficient $F_2$ obtained by the interpolation, as described above. The equation is again shown:

$$Cd_2(R) = F_2 \cdot Q_2 \cdot Id_2 \left( R - \left( d_1 - d_1 \frac{Rp_2}{Rp_1} \right) - (-Rp_2 + Rpd_2) \right) \quad (35)$$

By using the equation including those moments $Rpd_2$, $\Delta Rpd_2$, $\gamma pd_2$ and $\beta pd_2$ and coefficient $F_2$, the simulation for the ion implantation can be performed by only an analytical method in a various process condition.

It is to be noted that $Q_2$ is obtained using the equation (17) and the factor $F_2$ represents a coefficient which indicates a multiple of the dosage for vacancies relative to the dosage for impurities, and is obtained for the material of the second layer by Monte Carlo method together with the point defect distribution moments $Rpd_2$ etc.

It is also to be noted that the point defect distribution $Cd_2(R)$ of the second layer is obtained from the normalized point defect distribution $Id_2(R)$ of the second layer, which is translated or shifted by a first amount of $d_1-d_1(Rp_2/Rp_1)$ in the positive direction of depth R, followed by a second translation by a second amount of $(-Rp_2+Rpd_2)$ in the positive direction of depth R. The first translation is introduced similarly to the impurity distribution profile for the second layer. The second translation $(-Rp_2+Rpd_2)$ represents an amount indicating how much the projected range for the point defect distribution defined for the material of the second layer should be shifted in the positive direction from the projected range of the impurity distribution.

As a result of the pair of translations applied to $Id_2(R)$, it follows that the projected range for the point defect distribution $Cd_2(R)$ of the two-layer structure should be shifted from the projected range for the impurity distribution $C_2(R)$ for the two-layer structure by an amount equivalent to the shift of the projected range for the point defect distribution defined for the second layer material from the projected range for the impurity distribution defined for the second layer material in the positive direction. After the calculation of the impurity and point defect distributions according to the ion implantation simulation, an impurity distribution profile after the thermal diffusion is calculated by means of a simulation for the thermal diffusion which considers the point defect distribution by using an impurity distribution and a point defect distribution thus obtained.

FIG. 11 shows profiles of impurity and point defect obtained by analytical simulation, by simulation using Monte Carlo method and actually measured for two-layer substrate of FIG. 10A. In the drawing, impurity and point defect concentrations are plotted against the depth of the substrate which included a 0.01 μm-thick oxide film and an underlying crystal silicon layer. In this example, phosphorous ions are implanted to the substrate with a 50 keV acceleration energy and a $5\times10^{12}$ ions/cm² dosage. The impurity distribution moments $Rp_2$, $\Delta Rp_2$, $\gamma p_2$ and $\beta p_2$ for the silicon layer are determined 0.0572, 0.0478, 0.77 and 10, respectively, based on the above described conditions and other conditions such as a tilt angle for implantation. Point defect distribution moments $Rpd_2$, $\Delta Rpd_2$, $\gamma pd_2$ and $\beta pd_2$ for the silicon layer are also determined to be $-0.01206$, 0.1953, 1.9743 and 2.1133, respectively, while factor $F_2$ is determined to be 102.3.

In FIG. 11, first through fifth profiles designated by corresponding numerals in parentheses represent: (1)— actual impurity distribution determined by a SIMS (Secondary ion mass spectrometry) method; (2)—impurity distribution obtained by simulation using Pearson distribution; (3)—point defect distribution obtained by simulation using a Monte Carlo method; (4)—impurity distribution obtained by simulation using a Pearson distribution; and (5)—point defect distribution obtained by analytical simulation using Pearson distribution according to the first embodiment. As shown in the drawing, the point defect distributions (3) and (5) obtained by the Monte Carlo method and by the analytical simulation using Pearson distribution, respectively, well coincide with each other.

Figure 12A:
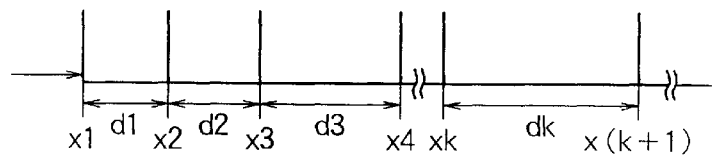
FIGS. 12A, 12B and 12C are a schematic diagram of a multilayer substrate, an impurity distribution profile in the substrate of FIG. 12A and impurity distribution and a point defect distribution profiles for the substrate of FIG. 12A, respectively, obtained by another embodiment of the present invention.

A simulation according to the second embodiment of the invention is applied to a semiconductor manufacturing process which includes an ion implantation step followed by a thermal diffusion step applied to a substrate having a more generalized multilayer structure. In FIG. 12A, which is similar to FIG. 4, a schematic structure of a multilayer substrate to be simulated by the second embodiment is shown. Materials which form the multilayer structure include a crystal layer such as a silicon crystal, for example, a non-crystal material such as an oxide film or aluminum film. An ion implantation simulation takes place for the multilayer substrate, calculating the impurity distributions of individual layers, followed by calculating a point defect distribution of a crystal layer. The calculation of these distributions takes place in the manner mentioned below.

Figure 12B:
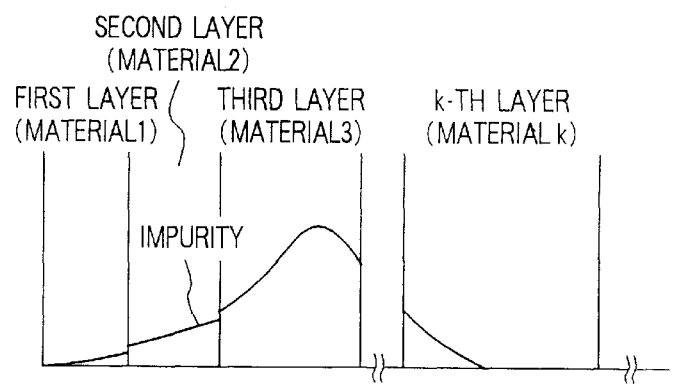
Figure 12C:
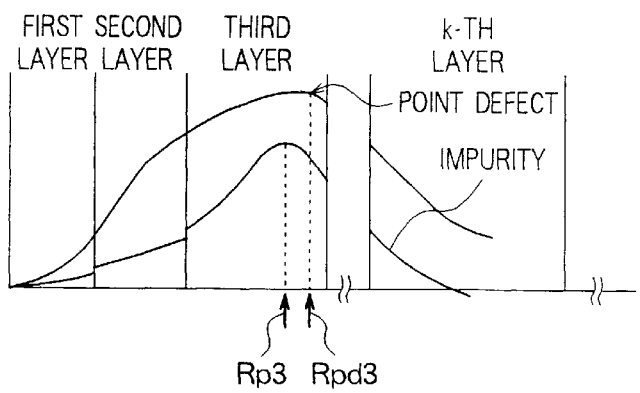

Initially, impurity distributions $Ck(R)$ ($K=1, 2, \ldots, n$) over the entire multilayer structure are obtained using a conventional technique, providing the profile for each layer as shown in FIG. 12B. Next, a point defect distribution $Cd_k(R)$ is obtained for each k-th layer in the multilayer structure, which comprises a crystal material, as shown in FIG. 12C, using the formula:

$$Cd_k(R) = F_k Q_k Id_k \left( R - \left( \sum_{i=1}^{k-1} d_i \left[ 1 - \frac{Rp_k}{Rp_i} \right] \right) - (-Rp_k + Rpd_k) \right) \quad (36)$$

$$Q_k = \text{Dose} \ (K = 1) \quad (37)$$

$$Q_k = Q_{k-1} - \int_{x_{k-1}}^{x_k} C_{k-1}(R) dR \ (k > 1)$$

In the above formulae, $Id_k(R)$ represents a normalized point defect distribution for the k-th layer, Dose a dosage of implanted impurities, $Rp_k$ a projected range for an impurity distribution defined for the material of the k-th layer, and $Rpd_k$, a projected range for point defect distribution defined for the material of the k-th layer. It is to be noted that $Rp_k$ and $Rpd_k$ are parameters which are obtained for the material of the k-th layer, similarly to the first embodiment. $R_k$ is a parameter representing a multiple of the dosage of the point defect distribution resulting from the ion implantation relative to the dosage of the impurity distribution.

After the impurity distribution and the point defect distribution are calculated by the ion implantation simulation, an impurity distribution which occurs after the thermal diffusion is calculated by means of the thermal diffusion simulation which considers the point defect distribution, using the impurity distribution and the point defect distribution as initial values.

Since above embodiments are described only for examples, the present invention is not limited to such embodiments and it will be obvious for those skilled in the art that various modifications or alterations can be easily made based on the above embodiments within the scope of the present invention.

What is claimed is:

1. A method for simulating an impurity distribution in a multilayer structure having a plurality of layers including at least one crystal layer, said method comprising:

a) analytically simulating an impurity distribution for each of said plurality of layers to obtain a first impurity distribution profile for said each of said plurality of layers by using impurity distribution moments defined for the each said plurality of layers under a specified condition;

b) analytically simulating a point defect distribution for said crystal layer to obtain a point defect distribution profile by using said first impurity distribution profile and point defect distribution moments defined for said crystal layer under said specified condition;

c) simulating a thermal diffusion for each of said plurality of layers to obtain a second impurity distribution profile for the each of said plurality of layers by using said first impurity distribution profile and said point defect distribution profile, wherein step b further comprises:

b1) calculating a normalized point defect distribution profile; and b2) shifting said normalized point defect distribution profile in a depthwise direction by a first and a second amounts to form a shifted normalized point defect distribution profile.

2. A method for simulating an impurity distribution as defined in claim 1 wherein said point defect distribution moments are obtained by a Monte Carlo simulation under typical conditions.

3. A method for simulating an impurity distribution as defined in claim 1 wherein said first amount corresponds to a projected range for impurity ions in said crystal layer.

4. A method for simulating an impurity distribution as defined in claim 1 wherein said second amount corresponds to a difference between a first projected range for implanted ions and a second projected range for vacancies in said crystal layer.

5. A method for simulating an impurity distribution as defined in claim 1 wherein step b further comprises:

b3) multiplying said shifted normalized point defect distribution profile by a parameter corresponding to a multiple of first dosage for vacancies relative to a second dosage for impurity ions.

* * * * *

UNITED STATES PATENT AND TRADEMARK OFFICE
CERTIFICATE OF CORRECTION

PATENT NO.: 5,859,784
DATED: January 12, 1999
INVENTOR(S): Koichi SAWAHATA

It is certified that error appears in the above-identified patent and that said Letters Patent is hereby corrected as shown below:

Column 6, Equation 27 delete in its entirety and insert --$D=D^{\circ}+D^{+}[V^{+}]+D^{-}[V^{-}]+D^{=}[V^{=}]$--

Column 10, Line 63 delete "the"

Column 11, Line 5 delete "the"

Signed and Sealed this

Twenty-ninth Day of June, 1999

Q. TODD DICKINSON

Attest:

*Attesting Officer*   *Acting Commissioner of Patents and Trademarks*